(12) United States Patent
Devos

(10) Patent No.: US 7,201,782 B2
(45) Date of Patent: Apr. 10, 2007

(54) GAS GENERATION SYSTEM

(75) Inventor: John A Devos, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 10/245,395

(22) Filed: Sep. 16, 2002

(65) Prior Publication Data

US 2004/0052704 A1    Mar. 18, 2004

(51) Int. Cl.
- *B01J 7/00* (2006.01)
- *B32B 27/04* (2006.01)
- *H01M 8/04* (2006.01)
- *H01M 8/18* (2006.01)
- *C01B 3/08* (2006.01)

(52) U.S. Cl. .......... 48/61; 422/129; 422/105; 423/657; 423/644; 429/17; 429/19

(58) Field of Classification Search ............. 423/657; 429/19, 17; 48/197 R
See application file for complete search history.

(56) References Cited

U.S. PATENT DOCUMENTS

| | | | |
|---|---|---|---|
| 3,674,702 A | 7/1972 | MacKenzie et al. | |
| 3,931,395 A | 1/1976 | Beckert et al. | |
| 4,002,553 A | 1/1977 | Arntz | |
| 4,157,270 A | 6/1979 | Martignoni et al. | |
| 4,203,814 A | 5/1980 | Grantham | |
| 4,227,977 A | 10/1980 | Grantham | |
| 4,236,984 A | 12/1980 | Grantham | |
| 4,359,327 A | 11/1982 | Armand et al. | |
| 5,122,264 A * | 6/1992 | Mohr et al. | 210/111 |
| 5,454,860 A | 10/1995 | Zhu | |
| 5,702,491 A * | 12/1997 | Long et al. | 48/197 R |
| 6,068,683 A | 5/2000 | Carnes et al. | |
| 6,083,425 A | 7/2000 | Clawson et al. | |
| 6,123,913 A | 9/2000 | Clawson et al. | |
| 6,126,908 A | 10/2000 | Clawson et al. | |
| 6,152,987 A | 11/2000 | Ma et al. | |
| 6,179,902 B1 | 1/2001 | Kawae et al. | |
| 6,207,122 B1 | 3/2001 | Clawson et al. | |
| 6,254,839 B1 | 7/2001 | Clawson et al. | |
| 6,316,133 B1 | 11/2001 | Bossel | |
| 6,322,723 B1 | 11/2001 | Thomas | |
| 6,340,379 B1 * | 1/2002 | Penth et al. | 95/45 |
| 6,358,488 B1 | 3/2002 | Suda | |
| 2001/0000380 A1 | 4/2001 | Buxbaum | |
| 2001/0004062 A1 * | 6/2001 | Rutledge et al. | 210/315 |
| 2001/0009653 A1 | 7/2001 | Clawson et al. | |
| 2001/0022960 A1 | 9/2001 | Kojima et al. | |
| 2002/0006533 A1 | 1/2002 | Bergman | |
| 2002/0025462 A1 * | 2/2002 | Nakanishi et al. | 429/19 |
| 2003/0091877 A1 * | 5/2003 | Chen et al. | 429/19 |
| 2003/0194368 A1 * | 10/2003 | Devos et al. | 423/657 |
| 2004/0048116 A1 * | 3/2004 | Ord et al. | 429/19 |

FOREIGN PATENT DOCUMENTS

| | | |
|---|---|---|
| WO | WO 98/00582 | 1/1998 |
| WO | WO0151410 | 7/2001 |
| WO | WO0174710 | 10/2001 |

* cited by examiner

*Primary Examiner*—Glenn Caldarola
*Assistant Examiner*—Kaity Handal

(57) ABSTRACT

A gas generation system includes a chemical reactor configured to produce a gas from a continuous flow of aqueous solution, and includes a pump configured to control the flow of the aqueous solution through the chemical reactor to control a production rate of the gas.

45 Claims, 7 Drawing Sheets

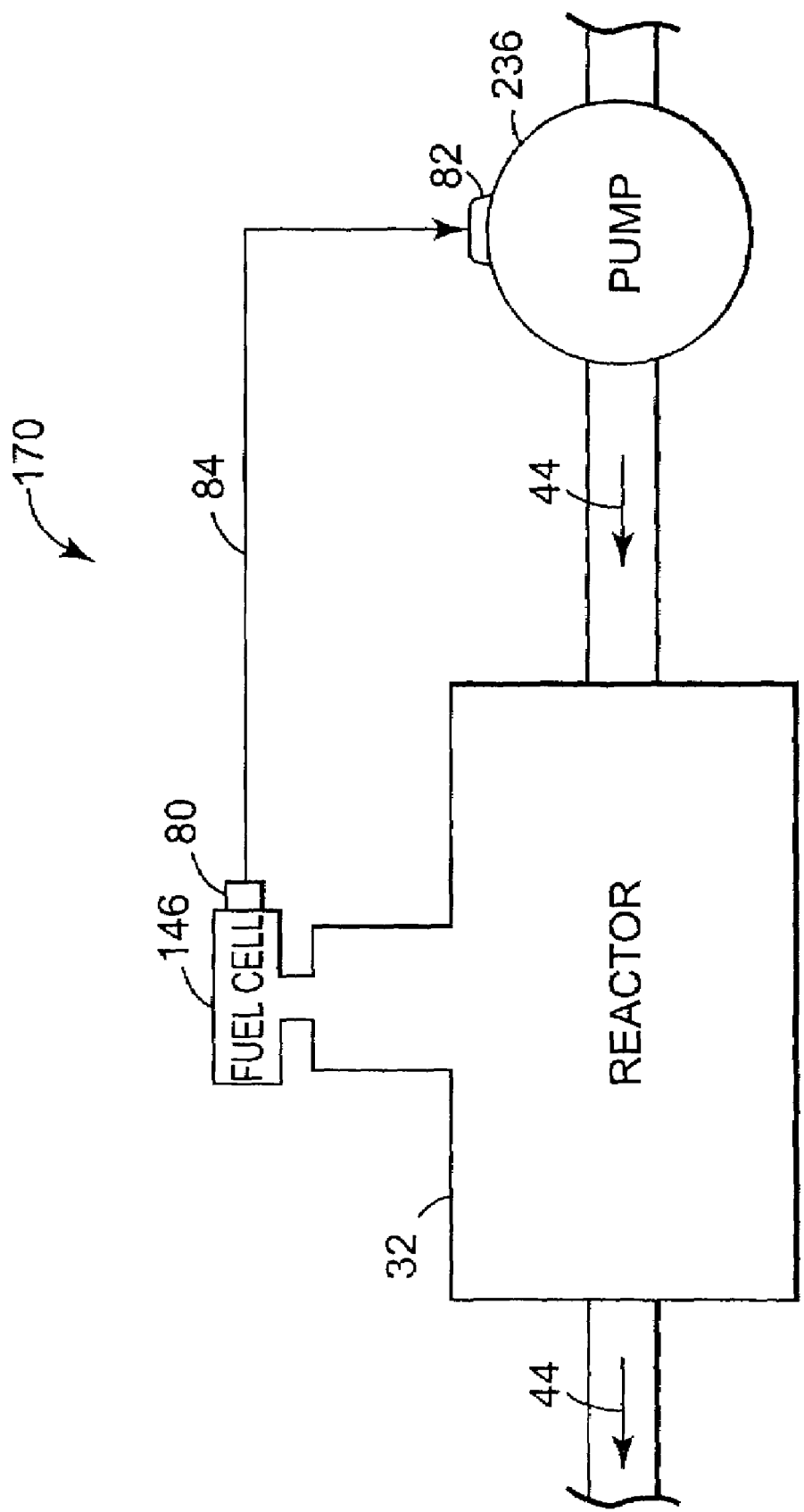

GAS GENERATION SYSTEM

BACKGROUND

Over the past century the demand for energy has grown exponentially. With the growing demand for energy, many different energy sources have been explored and developed. One of the primary sources for energy has been and continues to be the combustion of hydrocarbons. However, the combustion of hydrocarbons usually results in incomplete combustion and non-combustibles that contribute to smog and other pollutants in varying amounts.

As a result of the pollutants created by the combustion of hydrocarbons, the desire for cleaner energy sources has increased in more recent years. With the increased interest in cleaner energy sources, fuel cells have become more popular and sophisticated. Research and development on fuel cells has advanced to the point that many speculate that fuel cells will soon compete with the gas turbine for generating large amounts of electricity for cities, the internal combustion engine for powering automobiles, and batteries that are used for a variety of electronics applications.

Fuel cells conduct an electrochemical energy conversion of hydrogen and oxygen into electricity and heat. Fuel cells are similar to batteries, but they can be "recharged" while providing power.

Fuel cells provide a DC (direct current) voltage that can be used to power motors, lights, or any number of electrical appliances. There are several different types of fuel cells, each using different types of chemical reactions to produce electricity and heat. Fuel cells are usually classified by the type of electrolyte used. The fuel cell types are generally categorized into one of five groups; proton exchange membrane (PEM) fuel cells; alkaline fuel cells (AFC); phosphoric-acid fuel cells (PAFC): solid oxide fuel cells (SOFC); and molten carbonate fuel cells (MCFC).

The PEM fuel cells are currently believed to be the most promising fuel cell technology, and use one of the simplest reactions of any fuel cell. Referring to FIG. 1, a PEM fuel cell is illustrated at 10 which includes four basic elements: an anode 12; a cathode 14: an electrolyte (PEM) 16; and a catalyst 18 arranged on each side of the electrolyte 16.

Anode 12 is the negative post of the fuel cell and conducts electrons that are freed from hydrogen molecules such that the electrons can be used in an external circuit 20. Anode 12 includes channels 22 etched therein to disperse the hydrogen gas as evenly as possible over the surface of the catalyst 18.

Cathode 14 is the positive post of the fuel cell, and has channels 24 etched therein to evenly distribute oxygen (usually air) to the surface of the catalyst 18. Cathode 14 also conducts the electrons back from the external circuit to the catalyst, where they can recombine with the hydrogen ions and oxygen to form water. Water is the only by-product of the PEM fuel cell.

The electrolyte 16 is the proton exchange membrane (PEM) 16. The PEM is a specially treated porous material that conducts only positively charged ions. PEM 16 prevents the passage of electrons. In a working fuel cell, PEM 16 is sandwiched between anode 12 and cathode 14.

Catalyst 18 is typically a platinum powder thinly coated onto carbon paper or cloth. Catalyst 18 is usually rough and porous so as to maximize the surface area of the platinum that can be exposed to the hydrogen or oxygen. Catalyst 18 facilitates the reaction of oxygen and hydrogen.

The operation of the fuel cell can be described generally as follows. Pressurized hydrogen gas ($H_2$) enters the fuel cell on the anode 12 side. When an $H_2$ molecule comes into contact with the platinum on catalyst 18, the $H_2$ molecule splits into two H+ ions and two electrons (e−). The electrons are conducted through the anode 12, where they make their way through external circuit 20 that may be providing power to do useful work (e.g., turning a motor or lighting a bulb 26) and return to the cathode 14 side of the fuel cell.

Meanwhile, on the cathode 14 side of the fuel cell, oxygen gas ($O_2$) is being forced through the catalyst 18. In some PEM fuel cell systems, the $O_2$ source can be air. As $O_2$ is forced through catalyst 18, each $O_2$ molecule forms two oxygen atoms, each having a strong negative charge. The negatively charged oxygen atoms attract the H+ ions through PEM 16 such that two H+ ions combine with an oxygen atom and two of the electrons from the external circuit to form a water molecule ($H_2O$).

The PEM fuel cell reaction just described produces only about 0.7 volts, therefore, to raise the voltage to a more useful level, many separate fuel cells are often combined to form a fuel cell stack.

PEM fuel cells typically operate at fairly low temperatures (about 80° C./176° F.), which allows them to warm up quickly and to be housed in inexpensive containment structures because they do not need any special materials capable of withstanding the high temperatures normally associated with electricity production.

As discussed above, each of the fuel cells described uses oxygen and hydrogen to produce electricity. The oxygen required for a fuel cell is usually supplied by the air. In fact, for the PEM fuel cell, ordinary air is pumped into the cathode. However, hydrogen is not as readily available as oxygen.

Hydrogen can be difficult to generate and distribute. When hydrogen is generated from a fuel source such as sodium borohydride ($NaBH_4$), the reactions generate waste products in the form of precipitated waste which includes foam or froth. Typically the hydrogen produced in a reactor is separated by a unit discrete from the reactor. The separation scheme is typically a gravity-aided disengagement chamber to break the foam generated in the reactor. With the use of a discrete separator, the flow through the reactor tends to become unstable and difficult to control due to the formation of the waste. The lack of control is exacerbated by the need for very low flow rates for hydrogen generation in portable power applications.

Batched processes for producing hydrogen which use sodium borohydride as the fuel source can also be difficult to control. With batched processes, the generation efficiency is low and only a discrete amount of hydrogen can be produced at a time. Furthermore, precipitated waste is generated from the hydrogen-producing reaction which collects in the reactor.

Hydrogen bubbles can be formed in the reactor which increases the backpressure of the fuel source. To obtain a constant hydrogen supply, the pressure of the fuel source must be constantly changed to overcome the backpressure caused by the hydrogen bubbles.

One approach used to control the generation of hydrogen gas is to add a catalyst in a controlled fashion to control the speed of the reaction. While this approach can improve the control problems caused by the formation of waste and hydrogen bubbles, this approach slows the reaction rate and decreases the amount of hydrogen produced. Also, additional equipment is required to carefully control the administration of the catalyst.

In view of the above, there is a need for an improved hydrogen gas generation approach which improves the efficiency and control of hydrogen gas generation.

SUMMARY

As described herein a gas generation system may include a chemical reactor configured to produce a gas from a continuous flow of aqueous solution, and includes a pump configured to control the flow of the aqueous solution through the chemical reactor to control a production rate of the gas.

BRIEF DESCRIPTION OF THE DRAWINGS

FIG. 7 is a diagram illustrating a pump control feedback loop to control the hydrogen generation rate according to principles described herein.

DETAILED DESCRIPTION

In the following detailed description, reference is made to the accompanying drawings which form a part hereof, and in which is shown by way of illustration specific examples or embodiments of the principles described herein. It is to be understood that other embodiments may be utilized and structural or logical changes may be made without departing from the scope of the present disclosure. The following detailed description, therefore, is not to be taken in a limiting sense.

Figure 1:
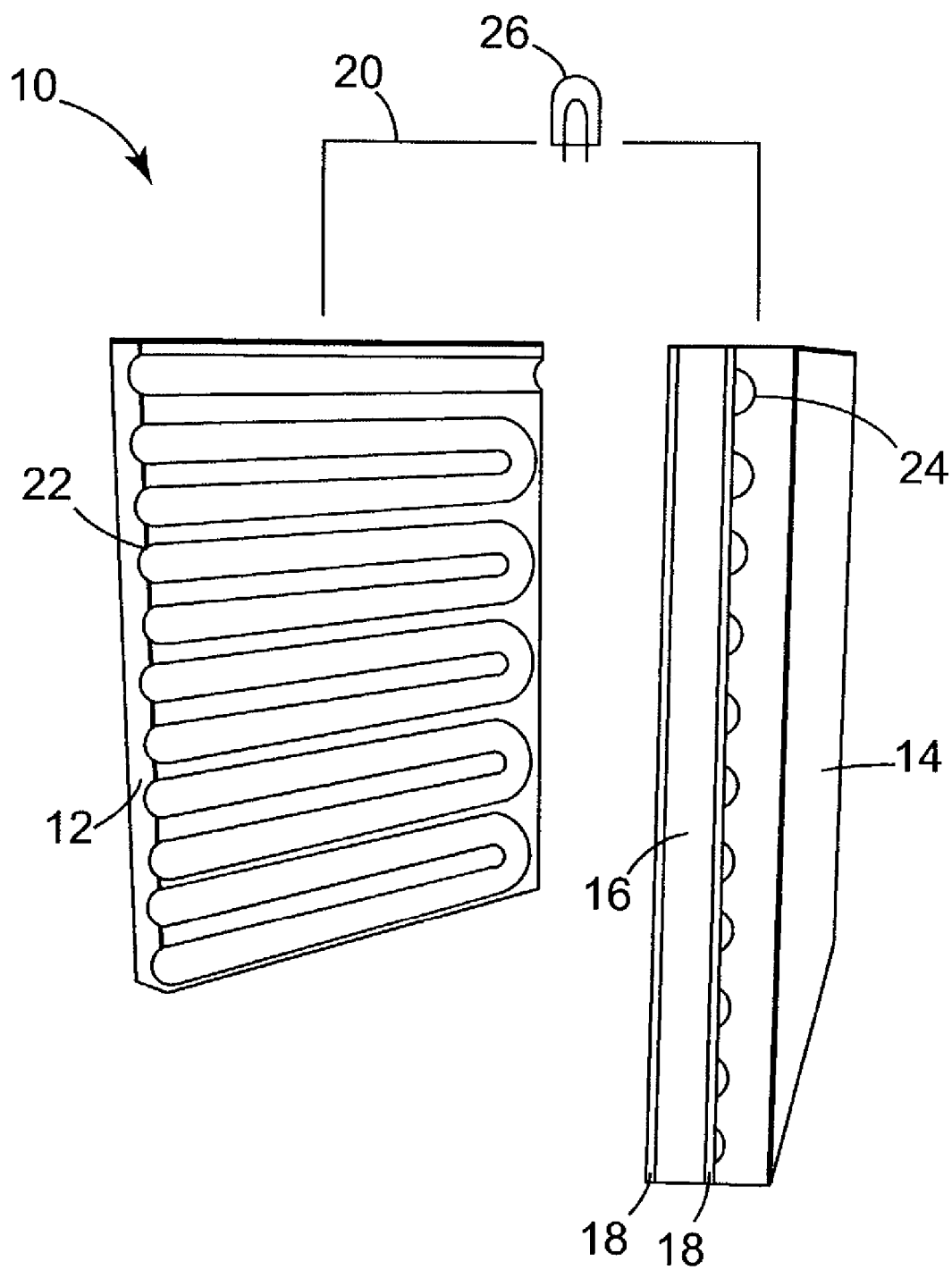
FIG. 1 is an unassembled perspective view of a fuel cell apparatus.
Figure 2:
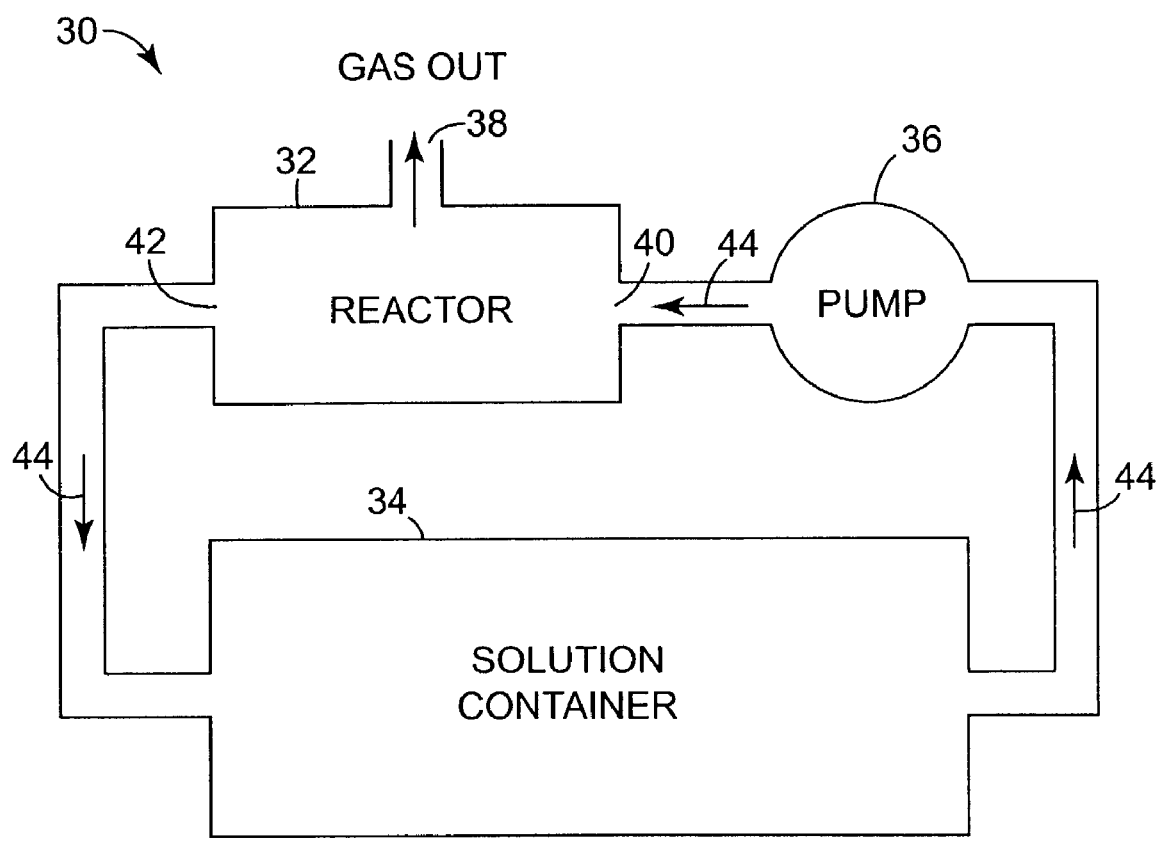
FIG. 2 is a diagram illustrating a gas generation system according to principles described herein.

FIG. 2 is a diagram illustrating a gas generation system 30 according to principles described herein. Gas generation system 30 includes a chemical reactor 32, a solution container 34 and a pump 36. Solution container 34 stores an aqueous solution which is circulated by pump 36 through reactor 32. In an example embodiment, gas generation system 30 is implemented as a hydrogen generator 30, which forms a closed loop system which allows the solution to be recirculated by pump 36 through reactor 32.

In one embodiment, the aqueous solution is sodium borohydride. In other embodiments, the aqueous solution is a metal hydride.

In one embodiment, recirculating the sodium borohydride solution through reactor 32 improves the efficiency of hydrogen generator 30. Sodium borohydride solution which exits reactor 32 is not necessarily depleted of its hydrogen generating ability. In various embodiments, the sodium borohydride solution can be passed through reactor 32 any suitable number of times until the sodium borohydride solution in the solution container 34 is depleted.

In one embodiment, reactor 32 is a chemical reactor which causes the sodium borohydride solution to decompose and generate hydrogen gas. In one embodiment, the hydrogen gas is used to power a fuel cell. In one embodiment, reactor 32 has a generally cylindrical shape. In other embodiments, any suitable shape for reactor 32 can be used. In various embodiments, reactor 32 can be constructed of metal, plastic, ceramic, composite, or other suitable materials. In other embodiments, reactor 32 is any container adapted to house a chemical reaction. In the illustrated embodiment, reactor 32 includes an inlet 40 for receiving a continuous stream of aqueous solution and an outlet 42 allowing the passage of solution out of reactor 32. The continuous stream of aqueous solution flows in and out of reactor 32 according to the direction of arrows 44.

In the illustrated embodiment, reactor 32 includes a gas outlet 38 which provides a path for gas generated within reactor 32. Gas generated in reactor 32 is separated from the continuous stream of aqueous solution by a liquid/gas separator such as a hydrophobic membrane. In other embodiments, reactor 32 includes hydrophilic screens at inlet 40 and/or outlet 42. The hydrophilic membrane passes the sodium borohydride solution but not the hydrogen gases. In other embodiments, no hydrophilic membranes are present and only hydrophobic membranes are used for gas separation. The hydrophobic membranes can be located adjacent to or surrounding the reaction chamber and/or the solution container, or elsewhere positioned in the system along with the gas collection chamber or chambers.

In one embodiment, the gas generation system is a gas generation cartridge and gas outlet 38 is a gas supply port configured to engage a receptacle through which a supply of the generated gas is provided. In this embodiment, the gas generation cartridge is inserted into a fuel cell receptacle and provides hydrogen gas to the fuel cell through the gas supply port (see also, FIG. 3).

In one embodiment, pump 36 has a flow rate which is set to match the hydrogen gas production rate of reactor 32. In one embodiment, the flow rate of the pump is set to match the hydrogen gas production rate required by a fuel cell coupled to reactor 32 (see also, FIG. 3). In various embodiments, the maximum hydrogen production rate is limited by the amount of catalyst surface area in contact with the sodium borohydride solution.

Figure 3:
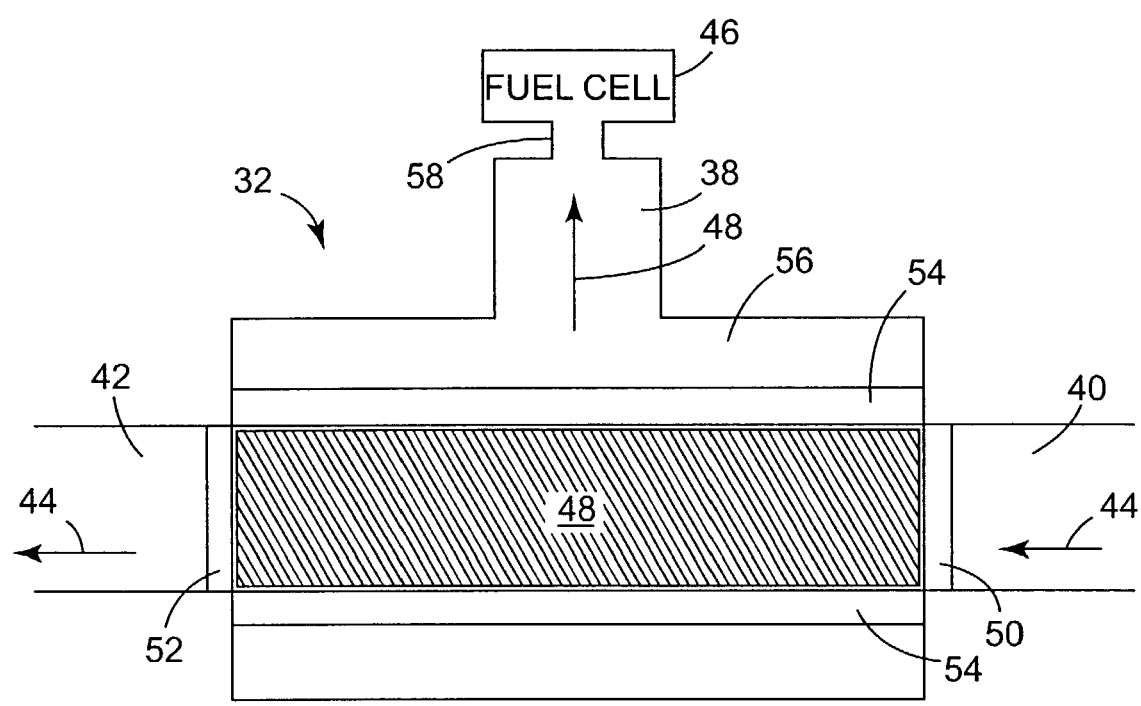
FIG. 3 is a cut-away view illustrating one embodiment of a fuel cell system which includes a reactor coupled to a fuel cell.

FIG. 3 is a cut-away view illustrating one embodiment of a fuel cell system which includes a reactor 32 coupled to a fuel cell 46. In other embodiments, reactor 32 is coupled to other apparatus which require hydrogen. In one embodiment, reactor 32 is coupled to and provides hydrogen to fuel cell 46 which is a proton exchange membrane (PEM) fuel cell.

In the illustrated embodiment, reactor 32 includes a catalyst disposed therein which is illustrated as a porous catalyst bed 48. Catalyst bed 48 facilitates the production of hydrogen gas by increasing the rate of reaction of a fuel source. In various embodiments, the catalyst includes a ruthenium catalyst, a platinum catalyst, a nickel catalyst, or other suitable catalyst.

In one embodiment, catalyst bed 48 facilitates the production of hydrogen gas in the presence of a borohydride. An aqueous sodium borohydride solution in the presence of catalyst bed 48 results in the release of hydrogen gas according to the following chemical equation:

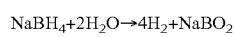

$$NaBH_4 + 2H_2O \rightarrow 4H_2 + NaBO_2$$

In the illustrated embodiment, reactor 32 has an inlet 40 for receiving a hydrogen fuel source such as sodium borohydride and an outlet 42 for discharging waste products and reactants in a continuous manner. Reactor 32 facilitates continuous production of hydrogen gas so that a flow of reactants and products enters and exits reactor 32 while the reaction is taking place. In the illustrated embodiment, the reactants and products flow through reactor 32 for an indefinite period of time allowing the recycling of products and reactants back through reactor 32 to facilitate more complete utilization of the fuel source.

In the illustrated embodiment, hydrophilic screens 50 and 52 are located at the inlet 40 and outlet 42 of reactor 32. Hydrophilic screens 50 and 52 readily allow the passage of liquid solutions therethrough while prohibiting the passage of all or substantially all hydrogen gas. In one embodiment, hydrophilic screens 50 and 52 are stainless steel filter screens. In one embodiment, the effective pore sizes of hydrophilic screens 50 and 52 are selected to balance pressure drop and bubble pressure to ensure liquid/gas separation. In other embodiments, the hydrophilic screens 50 and 52 have suitable effective pore sizes. In one embodiment, a stainless steel filter screen with an effective pore size of 6 μm can be used. In other embodiments, only one of hydrophilic screens 50 or 52 is used at either inlet 40 or outlet 42.

In the illustrated embodiment, reactor 32 also includes a hydrophobic membrane 54 surrounding catalyst bed 48 for lining an internal or external surface of reactor 32. In the embodiment shown, hydrophobic membrane 54 does not cover inlet 40 or outlet 42 so as to allow the passage of liquids through the reactor 32. Hydrophobic membrane 54 allows hydrogen gas to pass therethrough. However, liquids tend not to pass through hydrophobic membrane 54. The combination of hydrophobic membrane 54 and hydrophilic membranes 50 and 52 provide separation paths for the resultant liquid/gas mixture produced from the sodium borohydride solution. In the illustrated embodiment, reactor 32 is an integrated liquid/gas separator.

In various embodiments, hydrophobic membrane 54 is made, at least in part, from Goretex®, Celgard®, or other suitable materials. These materials are used as the liquid/gas separator in reactor 32 because of the relatively low temperatures associated with the production of hydrogen gas from sodium borohydride. In one embodiment, with sodium borohydride as the fuel source, the temperature of reactor 32 does not exceed approximately 93° C. 200° F.). In other embodiments, the temperature does not exceed approximately 80° C. (176° F.). In still other embodiments, the temperature of reactor 32 does not exceed the boiling point of the sodium borohydride solution, or exceed any other temperature that may compromise the material compatibility of any reactor component.

In the illustrated embodiment, reactor 32 includes a gas collection chamber or container 56 which is adjacent to or surrounding reactor 32. Hydrogen gas produced in reactor 32 passes through hydrophobic membrane 54 and enters gas collection chamber 56. Gas collection chamber 56 provides a path in the direction of arrow 48 through opening 58 for the produced hydrogen to pass into fuel cell 46.

Figure 4:
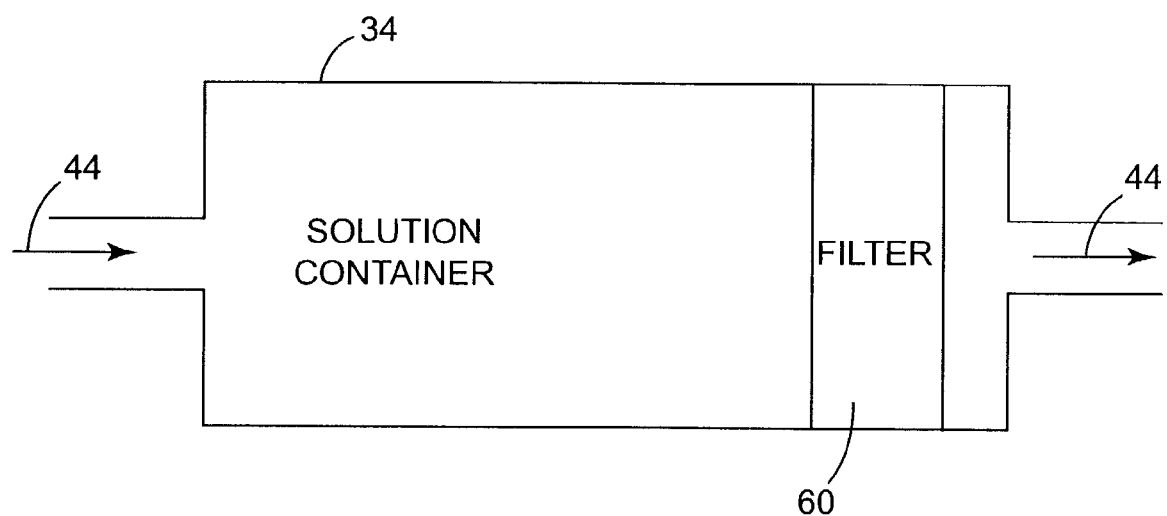
FIG. 4 is a diagram illustrating a solution container according to principles described herein.

FIG. 4 is a diagram illustrating a solution container 34 according to principles described herein. In the illustrated embodiment, when gas generation system 30 generates hydrogen from sodium borohydride, waste products are generated from the reaction which are in the form of a precipitated waste. These waste products remain in the sodium borohydride solution and are circulated into solution container 34 in the direction of arrows 44. Solution container 34 includes a high surface area filter 60 which filters out the precipitated waste before the solution is circulated out of solution container 34 in the direction of arrows 44. This improves the efficiency of gas generation system 30 by extending the system life by preventing reactor 32, pump 36 and other system components from becoming fouled by the precipitated waste. In the illustrated embodiment, filter 60 improves the efficiency of gas generation system 30 by allowing the sodium borohydride solution to be recirculated a suitable number of times through reactor 32 to facilitate more complete utilization of the fuel source.

In various embodiments, suitable solution concentrations of sodium borohydride relative to water can range from less than 10% to greater than 30%. Lower concentrations of sodium borohydride increases the water solubility for the precipitated waste but also reduces the total amount of hydrogen production available from the solution. In the illustrated embodiment, filter 60 improves the efficiency of gas generation system 30 by allowing a higher concentration of sodium borohydride solution to be used to generate the hydrogen.

Figure 5:
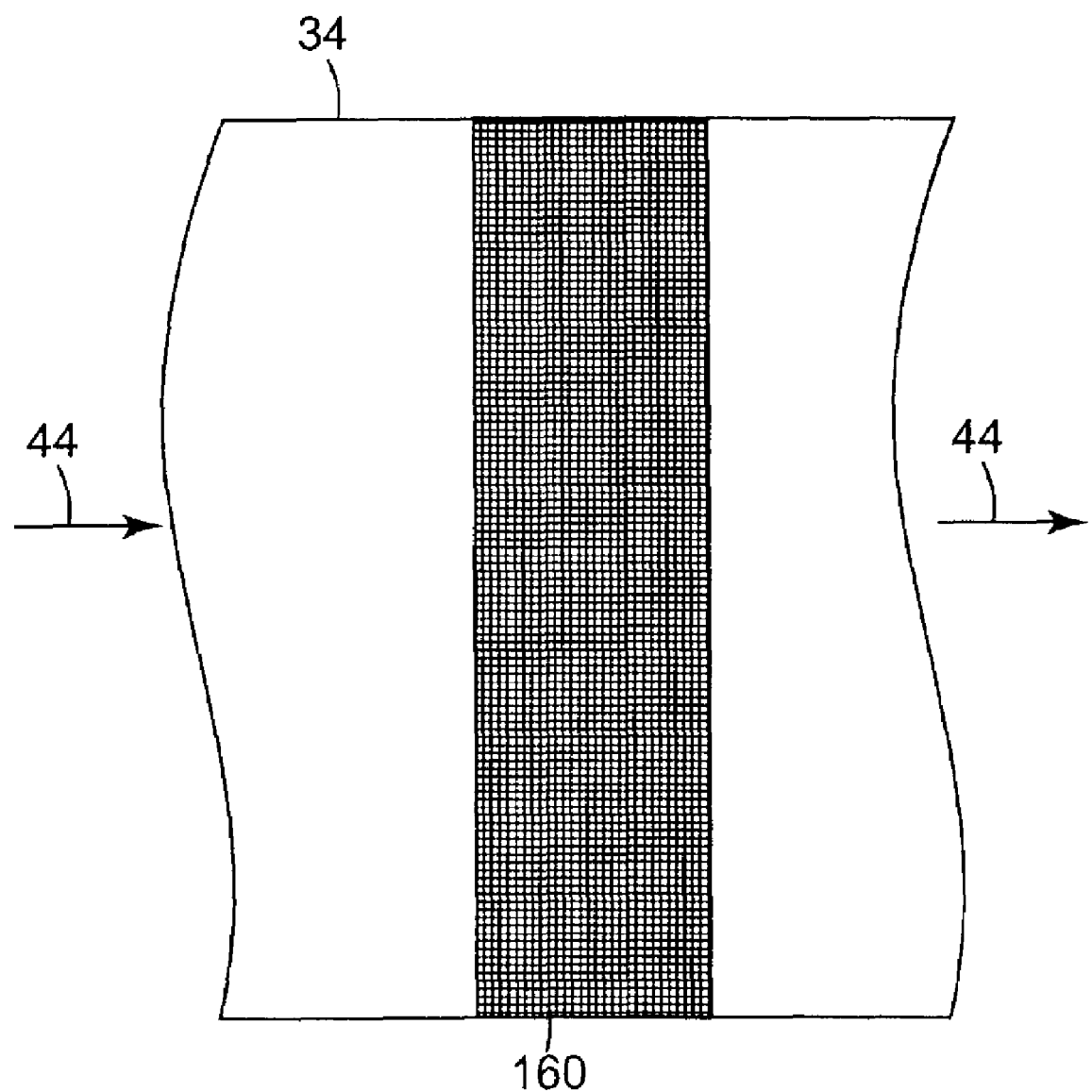
FIG. 5 is a cut-away view illustrating a waste precipitate filter according to principles described herein.

FIG. 5 is a cut-away view illustrating a waste precipitate filter 160 according to principles described herein. Waste precipitate filter 160 is configured to filter out precipitated waste from the solution circulating in the direction of arrows 44. In the illustrated embodiment, filter 160 is a high surface area hydrophilic filter. In one embodiment, filter 160 is a stainless steel filter screen. In various embodiments, filter 160 has an effective pore size of 6 μm or more. In various embodiments, the effective pore size of filter 160 is any suitable size which is equal to or greater than the effective pore size of hydrophilic screens 50 and 52. In various embodiments, the effective pore size of filter 160 is less than the pore size of catalyst bed 48. In various embodiments, filter 160 is constructed of any suitable material such as polypropylene which does not react with the solution and generate hydrogen within solution container 34.

Figure 6:
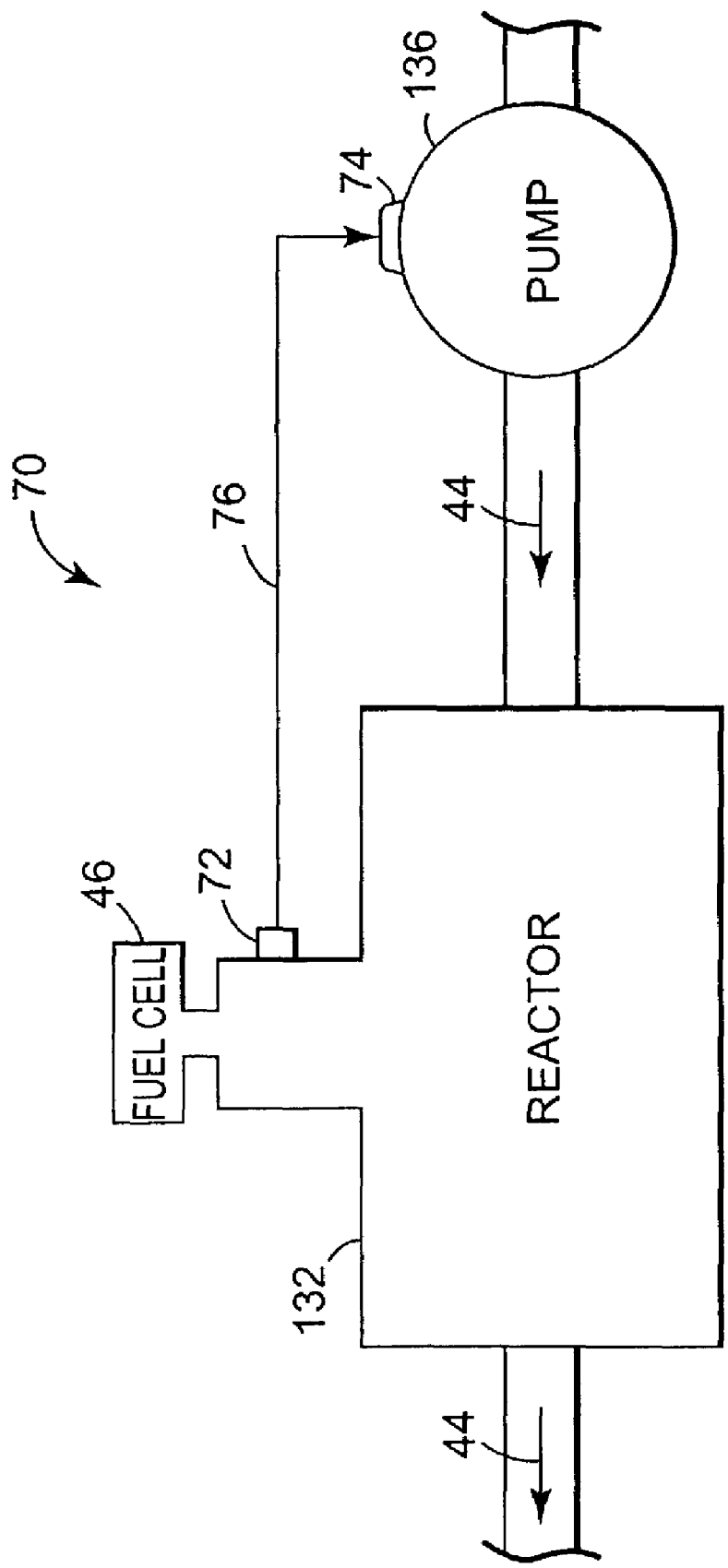
FIG. 6 is a diagram illustrating a pump control feedback loop to control the hydrogen generation rate according to principles described herein.

FIG. 6 is a diagram illustrating a pump control feedback loop 70 to control the hydrogen generation rate according to principles described herein. In the illustrated embodiment, reactor 132 includes a hydrogen pressure-to-voltage transducer 72 which monitors the hydrogen pressure in reactor 132- and provides a voltage output in response. In various embodiments, the transducer can convert hydrogen or hydrogen pressure into either a voltage or a current.

In the illustrated embodiment, transducer 72 is coupled to a pump control module 74 via an electrical line 76 to control the flow rate at which the solution is circulated through reactor 132 in the direction of arrows 44. The pump solution circulation rate can be set at any suitable level by any suitable means. In one embodiment, pump control module 74 is coupled to an external controller which is used to monitor and control the solution circulation rate. In one embodiment, pump 136 is an electric pump which is responsive to pump control module 74.

In one embodiment, feedback loop 70 is configured to maintain the hydrogen generation rate at a constant level. As the solution is recirculated through reactor 132, the hydrogen generation rate tends to decrease as the solution is used up. Feedback loop 70 increases the flow rate of pump 136 to increase the exposure of the solution to the catalyst in order to maintain the hydrogen generation rate at a constant level.

FIG. 7 is a diagram illustrating a pump control feedback loop 170 to control the hydrogen generation rate according to principles described herein. In the illustrated embodiment, fuel cell 146 generates a voltage and includes a voltage output 80 which provides a voltage output which is proportional to the fuel cell reaction. In various embodiments, any suitable number of PEMs can be stacked together. In one embodiment, the PEM fuel cell reaction produces a voltage which is equal to about 0.7 volts times the number of PEMs stacked together.

In the illustrated embodiment, voltage output 80 is coupled to a pump control module 82 via an electrical line 84 to control the flow rate at which the solution is circulated through reactor 32 in the direction of arrows 44. The pump solution circulation rate can be set at any suitable level by any suitable means. In one embodiment, pump control module 82 is coupled to an external controller which is used to monitor and control the solution circulation rate. In one embodiment, pump 236 is an electric pump which is responsive to pump control module 82.

In one embodiment, feedback loop 170 is configured to maintain the fuel cell 146 voltage output at a constant level. As the solution is recirculated through reactor 32, the hydrogen generation rate tends to decrease as the solution is used up. Feedback loop 170 increases the flow rate of pump 236 to increase the exposure of the solution to the catalyst in order to maintain the hydrogen generation rate at a constant level.

A feedback control system is coupled between a fuel cell configured to use the gas produced by the chemical reactor and the pump. The feed back control system is configured to measure the voltage supplied by the fuel cell and control a flow rate of the pump in response. In one embodiment, feedback loop 170 is configured to maintain the fuel cell 146 voltage output at a constant level. As the solution is recirculated through reactor 32, the hydrogen generation rate tends to decrease as the solution is used up. Feedback loop 170 increases the flow rate of pump 236 to increase the exposure of the solution to the catalyst in order to maintain the hydrogen generation rate at a constant level.

What is claimed is:

1. A gas generation system for supplying a gas to a fuel cell, said system comprising:
   a solution container configured to store an aqueous solution, the solution comprising a fuel for producing hydrogen gas;
   a chemical reactor configured to produce hydrogen gas from a continuous flow of the aqueous solution;
   a pump configured to control the flow of the aqueous solution from the solution container through the chemical reactor to control a production rate of the gas; and
   a voltage sensor configured to monitor a voltage produced by an electrochemical reaction conducted in said fuel cell, wherein said voltage sensor controls said pump based on said voltage produced by said fuel cell so as to maintain a desired voltage output by said fuel cell.

2. The gas generation system of claim 1, further comprising a return through which aqueous solution exiting the chemical reactor is returned to the solution container, wherein the pump recirculates the aqueous solution received in the solution container back through the chemical reactor.

3. The gas generation system of claim 2, wherein the solution container includes a high surface area filter configured to filter out precipitated waste from the aqueous solution.

4. The gas generation system of claim 3, wherein the filter is a hydrophilic filter.

5. The gas generation system of claim 3, wherein the filter is a stainless steel screen.

6. The gas generation system of claim 3, wherein the filter has an effective pore size which is equal to or greater than 6 μm.

7. The gas generation system of claim 1, further comprising: a hydrophobic membrane adjacent to or surrounding the solution container for separating the gas from the aqueous solution.

8. The gas generation system of claim 1, comprising: a feedback control system coupled between the chemical reactor and the pump configured to measure a pressure of the gas produced in the chemical reactor and control a flow rate of the pump in response.

9. The gas generation system of claim 8, wherein the flow rate of the pump is controlled to maintain the production rate of the gas at a constant level.

10. The gas generation system of claim 1, wherein the fuel for producing hydrogen gas comprises a metal hydride.

11. The gas generation system of claim 10, wherein the fuel comprises sodium borohydride.

12. The gas generation system of claim 1, further comprising: a hydrophobic membrane positioned within the gas generation system wherein the hydrophobic membrane separates gas from the aqueous solution.

13. The gas generation system of claim 1, further comprising: a hydrophobic membrane adjacent to or surrounding the chemical reactor for separating the gas from the aqueous solution.

14. The gas generation system of claim 1, wherein the chemical reactor has an inlet and outlet, further comprising: at least one hydrophilic screen positioned at the outlet of the chemical reactor to prevent generated gas from recirculating in the aqueous solution.

15. The gas generation system of claim 1, further comprising: at least one hydrophilic screen positioned within the continuous flow of aqueous solution.

16. A gas generation cartridge, comprising:
   a solution container configured to store an aqueous solution, the solution comprising a fuel for producing hydrogen gas;
   a chemical reactor configured to produce hydrogen gas from a continuous flow of aqueous solution;
   a pump configured to control the flow of the aqueous solution from the solution container through the chemical reactor to control a production rate of the gas;
   a gas supply port in said chemical reactor configured to engage a receptacle through which a supply of the generated gas is provided; and
   a hydrophilic screen over an outlet of said chemical reactor for separating hydrogen gas from said flow of aqueous solution.

17. The gas generation cartridge of claim 16, further comprising a return through which aqueous solution exiting the chemical reactor is returned to the solution container, wherein the pump recirculates the aqueous solution received in the solution container back through the chemical reactor.

18. The gas generation cartridge of claim 17, wherein the solution container includes a high surface area filter configured to filter out precipitated waste from the aqueous solution.

19. The gas generation cartridge of claim 18, wherein the filter is a hydrophilic filter.

20. The gas generation cartridge of claim 18, wherein the filter is a stainless steel screen.

21. The gas generation cartridge of claim 18, wherein the filter has an effective pore size which is equal to or greater than 6 μm.

22. The gas generation cartridge of claim 16, comprising: a feedback control system coupled between the chemical reactor and the pump configured to measure a pressure of the gas produced in the chemical reactor and control a flow rate of the pump in response.

23. The gas generation cartridge of claim 22, wherein the flow rate of the pump is controlled to maintain the production rate of the gas at a constant level.

24. The gas generation system of claim 16, wherein the fuel for producing hydrogen gas comprises a metal hydride.

25. The gas generation system of claim 24, wherein the fuel comprises sodium borohydride.

26. The gas generation cartridge of claim 16, wherein the cartridge is inserted into a fuel cell receptacle and provides hydrogen gas to the fuel cell through the gas supply port.

27. The gas generation cartridge of claim 16, further comprising: a hydrophobic membrane positioned within the gas generation cartridge wherein the hydrophobic membrane separates gas from the aqueous solution.

28. The gas generation cartridge of claim 16, further comprising: a hydrophobic membrane adjacent to or surrounding the chemical reactor for separating the gas from the aqueous solution.

29. The gas generation cartridge of claim 16, further comprising a hydrophilic screen positioned at an inlet of the chemical reactor to prevent generated gas from recirculating in the aqueous solution.

30. A method of generating a gas, comprising:
providing an aqueous solution comprising a fuel for producing hydrogen gas;
producing hydrogen gas from a continuous flow of the aqueous solution through a chemical reactor; and
operating a pump to control the flow of the aqueous solution from a supply of the solution through the chemical reactor to control a production rate of the gas, wherein operating said pump further comprises operating said pump at a rate matched to a rate at which said producing of hydrogen gas is conducted such that a rate of said continuous flow of aqueous solution through said chemical reactor matches a rate at which said hydrogen gas is produced in said chemical reactor.

31. The method of claim 30, comprising: recirculating the aqueous solution to produce the gas.

32. The method of claim 31, comprising: filtering out precipitated waste from the aqueous solution before the aqueous solution is recirculated.

33. The method of claim 31, comprising: preventing produced gas from recirculating in the continuous flow of the aqueous solution with at least one hydrophilic screen.

34. The method of claim 30, comprising: measuring a pressure of the gas produced and controlling a flow rate of the aqueous solution in response.

35. The method of claim 34, comprising: controlling the flow rate of the aqueous solution to maintain the production rate of the gas at a constant level.

36. The method of claim 30, comprising: using the gas in a fuel cell to produce a voltage.

37. The method of claim 36, comprising: measuring the voltage and controlling a flow rate of the aqueous solution in response.

38. The method of claim 37, comprising: controlling the flow rate of the aqueous solution to maintain the voltage at a constant level.

39. The method of claim 30, comprising: separating the gas from the aqueous solution with a hydrophobic membrane.

40. The method of claim 30, comprising: preventing gas from flowing within the continuous flow of aqueous solution with at least one hydrophilic screen.

41. The gas generation system of claim 1, wherein a flow rate of the pump is matched to a reaction rate occurring within the chemical reactor.

42. The gas generation system of claim 1, further comprising a collection chamber connected to the chemical reactor for collecting hydrogen gas produced in the chemical reactor.

43. The gas generation system of claim 1, wherein the chemical reactor comprises a porous catalyst bed.

44. The gas generation system of claim 43, further comprising a filter in the solution container for filtering the aqueous solution during circulation of the solution, wherein a pore size of the filter is less than a pore size of the catalyst bed.

45. The gas generation system of claim 1, wherein the solution comprises 10–30% metal hydride.

* * * * *